US010001288B1

(12) United States Patent
Yang

(10) Patent No.: US 10,001,288 B1
(45) Date of Patent: Jun. 19, 2018

(54) SMART FAN AND VENTILATION SYSTEM AND METHOD

(71) Applicant: Frank Yang, Irvine, CA (US)

(72) Inventor: Frank Yang, Irvine, CA (US)

( * ) Notice: Subject to any disclaimer, the term of this patent is extended or adjusted under 35 U.S.C. 154(b) by 0 days. days.

(21) Appl. No.: 15/625,601

(22) Filed: Jun. 16, 2017

(51) Int. Cl.
| | |
|---|---|
| *F24F 7/013* | (2006.01) |
| *F24F 11/00* | (2018.01) |
| *F24F 13/15* | (2006.01) |
| *F24F 13/08* | (2006.01) |

(52) U.S. Cl.
CPC ............ *F24F 7/013* (2013.01); *F24F 11/006* (2013.01); *F24F 11/0012* (2013.01); *F24F 11/0015* (2013.01); *F24F 11/0034* (2013.01); *F24F 11/0078* (2013.01); *F24F 11/30* (2018.01); *F24F 11/62* (2018.01); *F24F 11/79* (2018.01); *F24F 13/082* (2013.01); *F24F 13/15* (2013.01); *F24F 11/58* (2018.01); *F24F 11/63* (2018.01); *F24F 11/64* (2018.01); *F24F 2011/0013* (2013.01); *F24F 2011/0023* (2013.01); *F24F 2011/0026* (2013.01); *F24F 2011/0027* (2013.01); *F24F 2011/0038* (2013.01); *F24F 2011/0042* (2013.01); *F24F 2011/0049* (2013.01); *F24F 2011/0057* (2013.01); *F24F 2011/0061* (2013.01); *F24F 2011/0063* (2013.01); *F24F 2011/0071* (2013.01); *F24F 2110/10* (2018.01); *F24F 2110/12* (2018.01); *F24F 2110/20* (2018.01); *F24F 2110/30* (2018.01); *F24F 2110/40* (2018.01); *F24F 2110/64* (2018.01); *F24F 2110/70* (2018.01); *F24F 2110/72* (2018.01); *F24F 2120/10* (2018.01); *F24F 2120/20* (2018.01); *F24F 2130/20* (2018.01); *F24F 2221/20* (2013.01)

(58) Field of Classification Search
CPC ......... F24F 11/00; F24F 11/0012; F24F 7/013
See application file for complete search history.

(56) References Cited

U.S. PATENT DOCUMENTS

| | | | | |
|---|---|---|---|---|
| 3,416,329 A * | 12/1968 | Thomas | .................... | F24F 1/02 62/262 |
| 4,846,399 A * | 7/1989 | Asselbergs | .............. | F04D 25/06 236/49.4 |
| 6,415,984 B1 * | 7/2002 | Parker | .................. | F04D 25/088 236/49.3 |
| 6,692,349 B1 * | 2/2004 | Brinkerhoff | .............. | F24F 7/00 236/51 |
| 6,837,786 B2 * | 1/2005 | Linde | .................... | F24F 13/082 454/256 |
| 8,752,399 B2 * | 6/2014 | Lingrey | .................. | F24F 1/027 454/202 |
| 8,979,622 B2 * | 3/2015 | Casey | .................... | F24F 13/15 454/314 |
| 2004/0253917 A1 * | 12/2004 | Kim | ......................... | E06B 7/10 454/200 |

(Continued)

*Primary Examiner* — Steven B McAllister
*Assistant Examiner* — Jonathan Cotov
(74) *Attorney, Agent, or Firm* — Arman Khosraviani

(57) ABSTRACT

A Smart Fan and Ventilation ("SFV") device having at least one memory configured to store instructions, a processor coupled to the at least one memory, a cover attached to a first surface of the SFV device, and one or more louvers attached to the cover, the processor configured to cause the one or more louvers to move based on instructions stored on the at least one memory.

22 Claims, 7 Drawing Sheets

(56) References Cited

U.S. PATENT DOCUMENTS

| | | | |
|---|---|---|---|
| 2006/0286918 A1* | 12/2006 | Vargas | B60H 1/00871 454/155 |
| 2007/0202794 A1* | 8/2007 | Antill | F24F 13/075 454/153 |
| 2008/0119127 A1* | 5/2008 | Stewart | F24F 11/04 454/256 |
| 2008/0179052 A1* | 7/2008 | Kates | F24D 19/1084 165/208 |
| 2010/0163633 A1* | 7/2010 | Barrett | B60H 1/00871 236/49.3 |
| 2011/0034120 A1* | 2/2011 | Jaiyeola | F24F 11/006 454/335 |
| 2011/0039490 A1* | 2/2011 | Wiese | F24F 7/013 454/200 |
| 2012/0260678 A1* | 10/2012 | Yoshida | F25B 41/062 62/56 |
| 2013/0099124 A1* | 4/2013 | Filson | G05D 23/1902 250/349 |
| 2013/0281002 A1* | 10/2013 | Cislo | F24F 7/06 454/258 |
| 2014/0326796 A1* | 11/2014 | Kymissis | F24D 19/0087 237/12 |
| 2014/0330438 A1* | 11/2014 | Haines | G05B 15/02 700/276 |
| 2016/0069581 A1 | 3/2016 | Wiese | |
| 2017/0097164 A1* | 4/2017 | Chang | F24F 1/027 |
| 2017/0115019 A1* | 4/2017 | Desmet | F24F 11/0012 |

\* cited by examiner

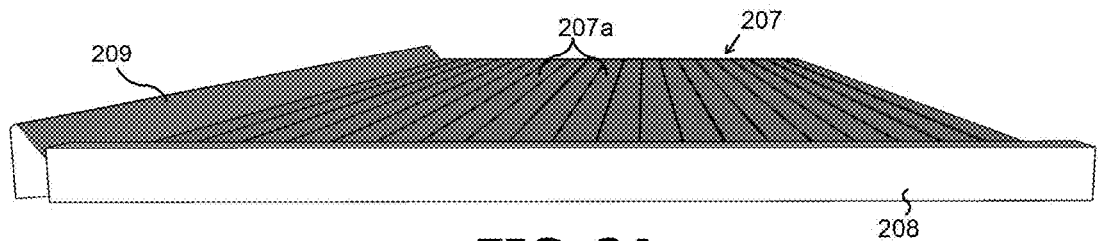
FIG. 2A
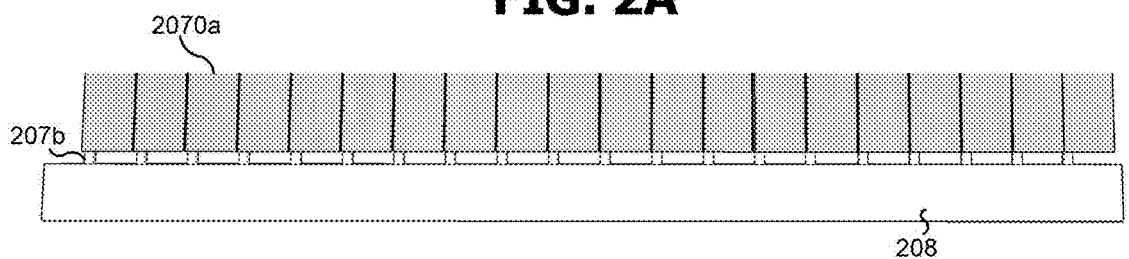
FIG. 2B
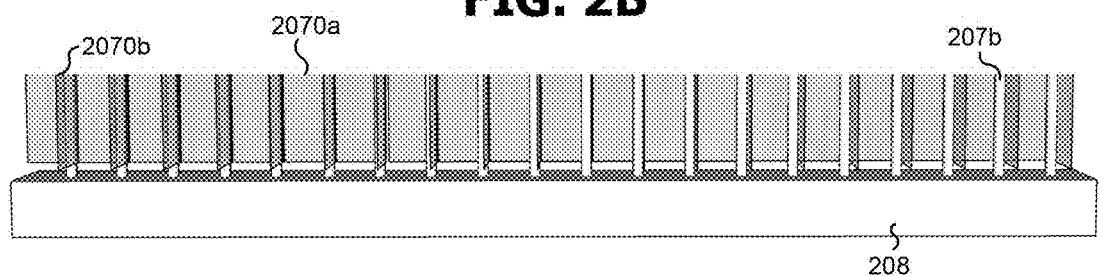
FIG. 2C
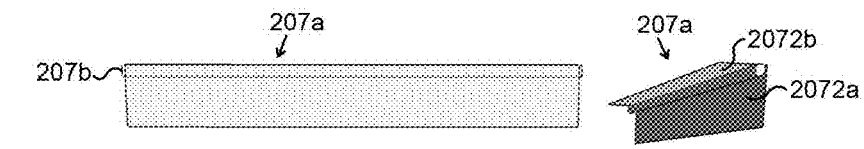
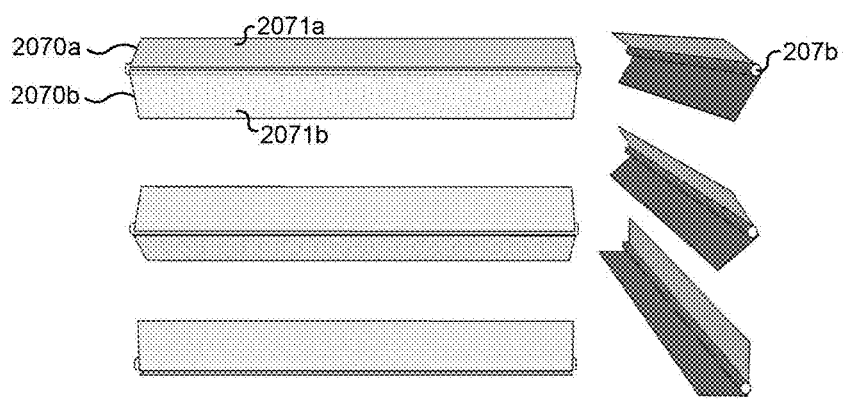
FIG. 2D  FIG. 2E

SMART FAN AND VENTILATION SYSTEM AND METHOD

CROSS-REFERENCE TO RELATED APPLICATIONS

The entire contents of the following applications are incorporated herein by reference: U.S. Nonprovisional patent application Ser. No. 15/386,670; filed on Dec. 21, 2016; and entitled AUTONOMOUS PAIRING OF INTERNET OF THINGS DEVICES. U.S. Nonprovisional patent application Ser. No. 15/454,446; filed on Mar. 9, 2017; and entitled DUAL VIDEO SIGNAL MONITORING AND MANAGEMENT OF A PERSONAL INTERNET PROTOCOL SURVEILLANCE CAMERA. Nonprovisional patent application Ser. No. 15/488,211 filed on Apr. 14, 2017; and entitled AN INTERACTIVE AUGMENTED-REALITY IoT DEVICES SYSTEMS AND METHODS. Nonprovisional patent application Ser. No. 15/490,826 filed on Apr. 18, 2017; and entitled GARAGE DOOR CONTROLLER AND MONITORING SYSTEM AND METHOD. Nonprovisional patent application Ser. No. 15/620,749 filed on Jun. 12, 2017; and entitled SMART REGISTER DEVICE AND METHOD.

FIELD

The present disclosure generally relates to monitoring and controlling ventilation in, a structure, and more particularly, to circulation of airflow in an interior space, an exterior space, and an exchange of air between an interior space and an exterior space.

BACKGROUND

There is a desire for users to have more control over environmental conditions in a building, home, or structure. Users may benefit from an automated, cost effective, and convenient control of cooling, heating, and ventilation within their building or home.

SUMMARY

The disclosed subject matter relates to a Smart Fan and Ventilation (hereinafter, "SFV") device and method. The SFV device having at least one memory configured to store instructions, a processor coupled to the at least one memory, a cover attached to a first surface of the SFV device, one or more louvers attached to the cover, the processor being configured to cause the one or more louvers of the cover to move based on instructions stored on the at least one memory.

The SFV device may be communicably coupled to one or more sensors, wherein the one or more sensors collect at least one of an interior environmental condition or an exterior environmental condition. The SFV device may further include at least one of the one or more sensors integrated within the SFV device. The one or more sensors may be a rain sensor, wherein the one or more louvers is positioned to a closed position when moisture is sensed by the rain sensor. The one or more sensors may include a temperature sensor, the one or more louvers may be positioned to a closed position or an open position when a predetermined delta temperature is triggered, the predetermined delta temperature is the difference between an interior environment temperature and an exterior environment temperature. The instructions processed by the processor may be based at least on the interior environmental condition or the exterior environmental condition, collected by the one or more sensors.

The SFV device may further include a network module coupling the SFV device to a local wireless network. The processor of the SFV device may receive instructions from a server or one or more other SFV devices. The cover of the SFV device may be detachably coupled to the first surface of the SFV device. The SFV device may further include a dispenser for storing a dispersible substance.

The SFV device may further include a grille having movable portions, the grille being attached to a second surface of the SFV device, the second surface being spaced apart and parallel to the first surface. The processor of the SFV device may be configured to cause the movable portions of the grille and the one or more louvers to change positions to isolate a first environment adjacent to the first surface from a second environment adjacent to the second surface, wherein the positions are one of an open position, a closed position, a partially open position or a partially closed position.

The SFV device may be mountable within a window frame of a window without the need to remove a window screen of the window, the window screen being adjacent to the second surface. The first surface of the SFV device, when mounted on the window, may be flush to window frame front side.

The SFV device may further include at least one motor to operate the one or more louvers to move, slide, or rotate to an open position, closed position, or partially closed position or partially opened position. Each of the one or more louvers includes a plate surface and a screen surface, the plate surface and screen surface may be perpendicular to each other and attach to one another at an edge, wherein the one or more louvers may be selected to have the plate surface or the screen surface parallel to the first surface. The plate surface may be substantially nonpermeable and the screen surface may be substantially permeable. The one or more louvers may be positioned to the open position when the screen surface is selected parallel to the first surface and to the closed position when the plate surface is selected parallel to the first surface.

The disclosed subject matter further relates to a method of detecting, by one or more sensors, an environmental condition, communicating the environmental condition to a smart fan and ventilation (SFV) device; and performing a first action, by the SFV, based on the detecting. The first action may include moving one or more louvers of a cover of the SFV device to an open position, a closed position, a partially open position or partially closed position. The first action may further include moving a movable portion of a grille of the SFV device to an open position, a closed position, a partially open position or partially closed position. The environmental condition may include at least one of a temperature, humidity, smoke, CO, $CO_2$, air particulate, ambient light, motion, barometer, infrared, airflow or airspeed information, the first action may further include acquiring the environmental condition by one or more sensors, from at least an interior environment or an exterior environment. The at least one of the one or more sensors integrated within the SFV device.

The method may further include a second action including moving both the one or more louvers of the cover and the movable portions of the grille to an open position, or a closed position. The method may further include comparing the environmental condition acquired by the one or more sensors to user preferences stored in a database prior to performing a second action.

The method may further include prompting, a user to approve of moving both the one or more louvers of the cover and the movable portions of the grille to an open position, or a closed position.

It is understood that other configurations of the present disclosure will become readily apparent to those skilled in the art from the following detailed description, wherein various configurations of the present disclosure are shown and described by way of illustration. As will be realized, the present disclosure of other different configurations and its several details are capable of modifications in various other respects, all without departing from the subject technology. Accordingly, the drawings and the detailed description are to be regarded as illustrative in nature and not restrictive.

BRIEF DESCRIPTION OF THE DRAWINGS

Certain features of the present disclosure are set forth in the appended claims. However, for purpose of explanation, several implementations of the present disclosure are set forth in the following figures.

FIGS. 2A-2E illustrate an exemplary embodiment of a cover of the SFV device of FIGS. 1A-1C.

Figure 1A:
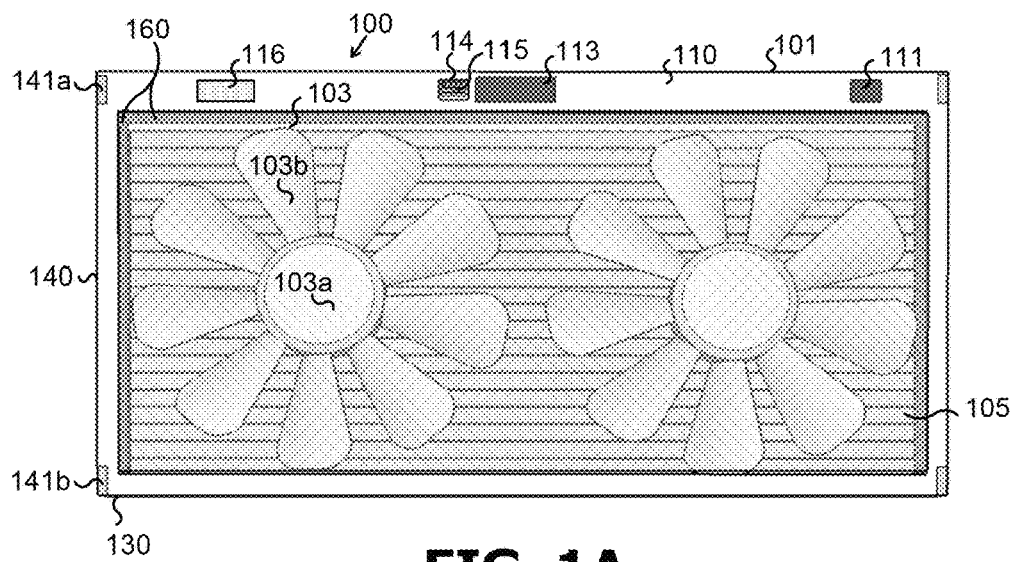
FIGS. 1A-1C illustrate an exemplary embodiment of an SFV device.

Embodiments of the present disclosure and their advantages are best understood by referring to the detailed description that follows. It should be appreciated that like-reference-numerals are used to identify like-elements illustrated in one or more of the figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

Various features of the present disclosure will now be described, and is not intended to be limited to the exemplary embodiments shown herein. Modifications to these features and exemplary embodiments will be readily apparent to those skilled in the art, and the principles defined herein may be applied to other exemplary embodiments without departing from the scope of the disclosure.

Figure 1B:
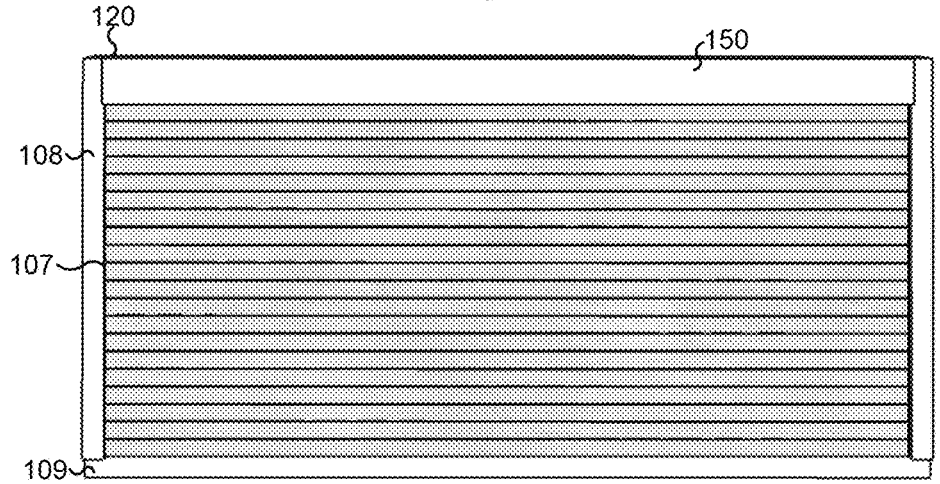
Figure 1C:
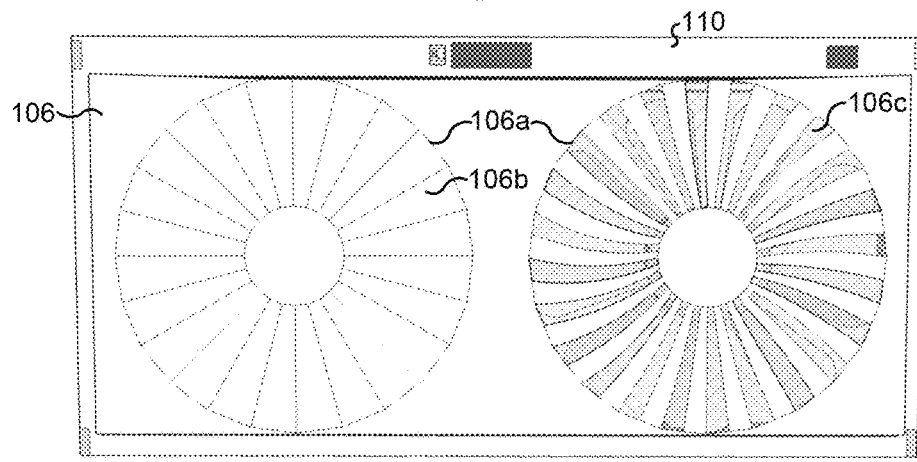

As shown in FIGS. 1A-1C, the SFV device 100 includes a housing 101, fan 103, a faceplate 106, and a cover 107. The housing 101 is formed by a front face 110, a top face 120, a bottom face 130, side faces 140, a back face 150, and a rain guide 109. The housing 101 may be made of plastic, plastic composites, polymers, or the like. Materials for the housing 101 may be selected to facilitate weatherproofing, waterproofing, and/or soundproofing. The housing 101 materials may include additive manufacturing materials, rubberlike and biocompatible photopolymers, thermoplastics, or any combination thereof.

The housing 101 may include at least one water drainage slot and waterways (not shown) to prevent accumulation of water or rainfall on or within the SFV device 100. The water drainage slot may be formed on the top face 120 or the back face 150. Adjacent surfaces of the front face 110, top face 120, bottom face 130, side faces 140, and back face 150 together form interior surfaces 160. The interior surfaces 160 may be inclined to direct water away from the front face 110 (interior environment) and towards the back face 150 (exterior environment). The edges of the back face 150 may be slanted to prevent water or debris from accumulating on the top face 120. The housing 101 may include a rain guide 109 (as shown in FIG. 2A) to direct water from the interior surfaces 160 and out into the exterior environment. The rain guide 109 may be detachable from the housing 101, or rotatably fixed to the housing 101 to be flush with the housing 101 or concealed from the housing 101 when not in use.

The SFV device 100 may include a plurality of screens 105 fitted on housing 101, for example, one screen 105 on the front face 110 and one screen 105 on the back face 150 to filter out environmental elements such as dust, rain, ice, dirt, insects, spider webs, and leaves. The screen 105 may be a micro mesh screen or an insect screen.

The SFV device 100 may include a pair of side extensions 141a and 141b extendable and lockable at any desired extension. In one exemplary embodiment, the pair of side extensions 141a and 141b may be configured to extend outwards vertically from the top face 120 and bottom face 130 to secure the SFV device 100 in the frame of a horizontally opening window. In another exemplary embodiment, the pair of side extensions 141a and 141b may be configured to extend outwards horizontally from the side faces 140 to secure the SFV device 100 in the frame of a vertically opening window. In some exemplary embodiments, only one side extension 141a may be used to secure the SFV device 100 to a window frame.

The fan 103 includes a fan, motor 103a and fan blades 103b. The fan motor 103a may operate in a forward mode (exhaust mode) or reverse mode (intake mode), allowing the fan 103 to move air in from an exterior environment to an interior environment, or move air in from an interior environment to an exterior environment. The fan motor 103a may be an AC induction motor or DC motor for causing movement of the associated fan blades 103b.

The housing 101 includes a controller 114 to control the operation of the fan 103, to activate, deactivate, reverse, or control its speed of operation. The controller 114 may include a processor, memory, network interface, wireless controller, wireless module, antenna, etc. The SFV device 100 may include wireless connectivity for remotely controlling the fan 103 speed, cover 107, and monitoring power or fan 103 usage, etc. The SFV device 100 may be user configured through a mobile device, or automate through a smart thermostat. The controller 114 may be further defined as the components of SFV device 401 disclosed in FIG. 4.

Figure 5:
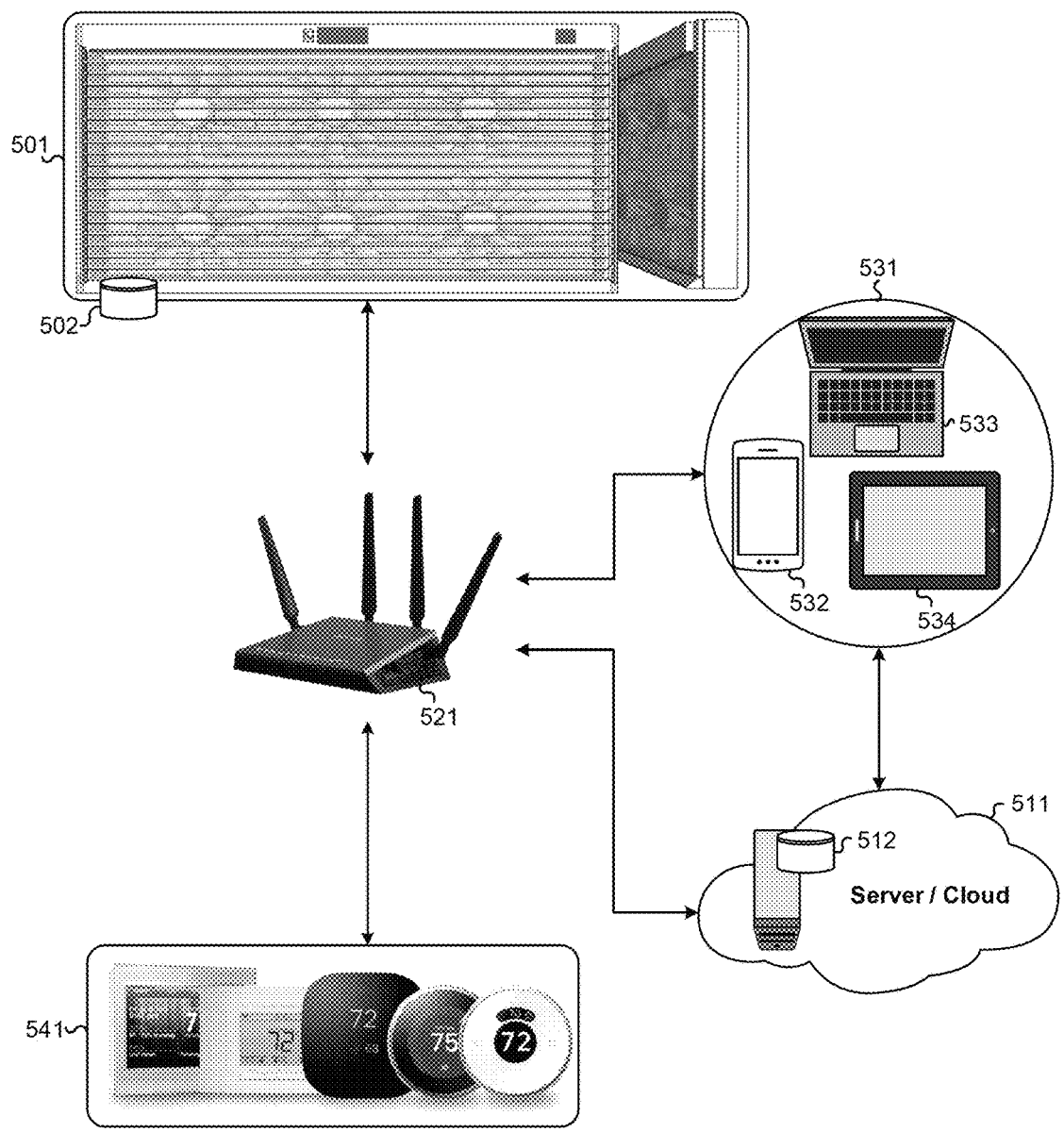
FIG. 5 illustrates an exemplary embodiment of the SFV device of FIGS. 1A-1C communicating with other smart devices or remote computing devices.

The controller 114 may be accessed remotely by a server 511, a smart thermostat 541, or remote computing device 531 (as shown in FIG. 5), or accessed manually through a user interface 115 and display 113 allowing a user to control the fan 103, cover 107, grille 106a, and openness of the aperture 106. The controller 114 may supply and regulate power and control signals to the fan 103 for operating the fan 103 based on received manual user input, sensed environmental conditions, scheduling, or a single or plurality of event triggers.

The SFV device 100 may include at least one sensor module 111 having various sensor components, for example, sensors for sensing temperature, humidity, smoke, CO, $CO_2$, an quality or particulate, ambient light, motion sensors, etc. The sensor module 111 is communicably coupled to the controller 114 for transmitting sensed environmental conditions to the SFV device 100. The sensor module 111 may be fixed to the housing 101, detachably coupled to the housing 101, or remotely connected to the housing 101. The SFV device 100 may include remote sensors (e.g. sensor module 315 of FIG. 3) and/or on-housing, sensors (e.g. sensor module 111). The SFV device 100 may be wirelessly coupled to other smart devices (e.g. thermostat 327) and remote sensors to measure air quality (smoke and particulate) and condition (humidity and temperature) for operating as an intake fan or exhaust fan, and for determining an operating schedule for improving room conditions.

The sensor module 111 may determine differentials (deltas) of any detected or collected environmental condition (e.g. temperature, humidity, etc.) in an interior and/or exterior environment. For example, delta T, or the difference of temperature between two measuring points which differ in time or spatial position. Differential temperature may be used, for example, to determine or facilitate efficient cooling, heating, or ventilation.

In some exemplary embodiments, the sensor module 111 may be installed on a ceiling or wall and communicably coupled to the controller 114 by a wireless network. The sensor module 111 may include its own controller for controlling the sensor components and processing data collected by the sensors. The sensor module 111 may be powered separately by a power supply, for example, a power adapter connected to an outlet and/or by disposable batteries or rechargeable batteries, for example, nickel cadmium (NiCd), lithium (Li) AA, AAA, and/or rechargeable capacitors, for example, supercapacitors (SC) or ultracapacitors. The power supply may also supply power to the sensor module 111 by, for example, solar panels/cell, or any other renewable/alternative power supply source. The sensor module 111 may use multiple battery types, for example, using a coin cell battery to operate some sensor components and a rechargeable battery for wireless connectivity.

The SFV device 100 may be powered by a power supply, for example, a power adapter connected to an outlet and/or by disposable batteries or rechargeable batteries, for example, nickel cadmium (NiCd), lithium (Li), AA, AAA, and/or rechargeable capacitors, for example, supercapacitors (SC) or ultracapacitors, or a combination of battery types. The SFV device 100 may include auxiliary power through a coin cell battery to operate the display 113 or some sensor components onto provide auxiliary power, while using a rechargeable Li battery or power adapter to provide power for operating cover 107 or fan 103. The power supply may also supply power to the SFV device 100 by, for example, a power adapter for connecting to an outlet, a solar panels/cell, or any other renewable/alternative power supply source. The SFV device 100 may connect to an exterior power source such as a solar panel or wind turbine.

The faceplate 106 couples to the front face 110 of the housing 101 to cover fan 103, fan motor 103a, and fan blades 103b. The faceplate 106 includes an aperture 106a and a grille 106b. The aperture 106a may be any shape and size and may extend to completely cover the interior surfaces 160 of the housing 101. The grille 106b may be fused to or detachably coupled to the faceplate 106. The grille 106b includes movable portions 106c positioned over the aperture 106a. The movable portions 106c are operated by a motor (not shown) to move and create an opening in the grille 106b. The movable portions 106c rotate or slide to expose a portion of the aperture 106a. The faceplate 106 insulates the interior environment from the exterior environment.

The cover 107 is positioned on the back face 150 and may extend to completely cover the interior surfaces 160 of the housing 101. The cover 107 is attached to a motor 108 that controls the cover 107 to open, partially open, and close. The motor 108 receives control signals from the controller 114 to operate based on received manual user input, sensed environmental conditions, scheduling, or a single or plurality of event triggers. The SFV device 100 is open when cover 107 is opened and closed when cover 107 is closed.

The housing 101 may include a plurality of fans 103, a plurality of apertures 106a, and a plurality of covers 107. In certain exemplary embodiments, the fan 103, fan blades 103b, grille 106b, faceplate 106, and/or cover 107 may be made of a transparent or translucent material to allow sunlight to pass through the front face 110 and back face 150 of the housing 101. The cover 107 may be made of similar materials as housing 101, or the cover 107 may be made from fabric, rubber, or other conventional cover materials. The faceplate 106 may be made of similar materials as housing 101.

The faceplate 106 and cover 107 may be fixed to the housing as shown in the exemplary embodiments of FIG. 1A-1C. However, in some exemplary embodiments, the faceplate 106 and cover 107 may be detachable from the housing 101. Detaching the faceplate 106 and cover 107 allows the SFV device 100 to have a slim profile. Once the cover 107 is detached, the SFV device 100 may be easily mounted and removed from a window frame without requiring removal of the window/insect screen. The SFV device 100 may be securely and removably mounted within a window frame without requiring any tools, special brackets, or mounting hardware.

Figure 3:
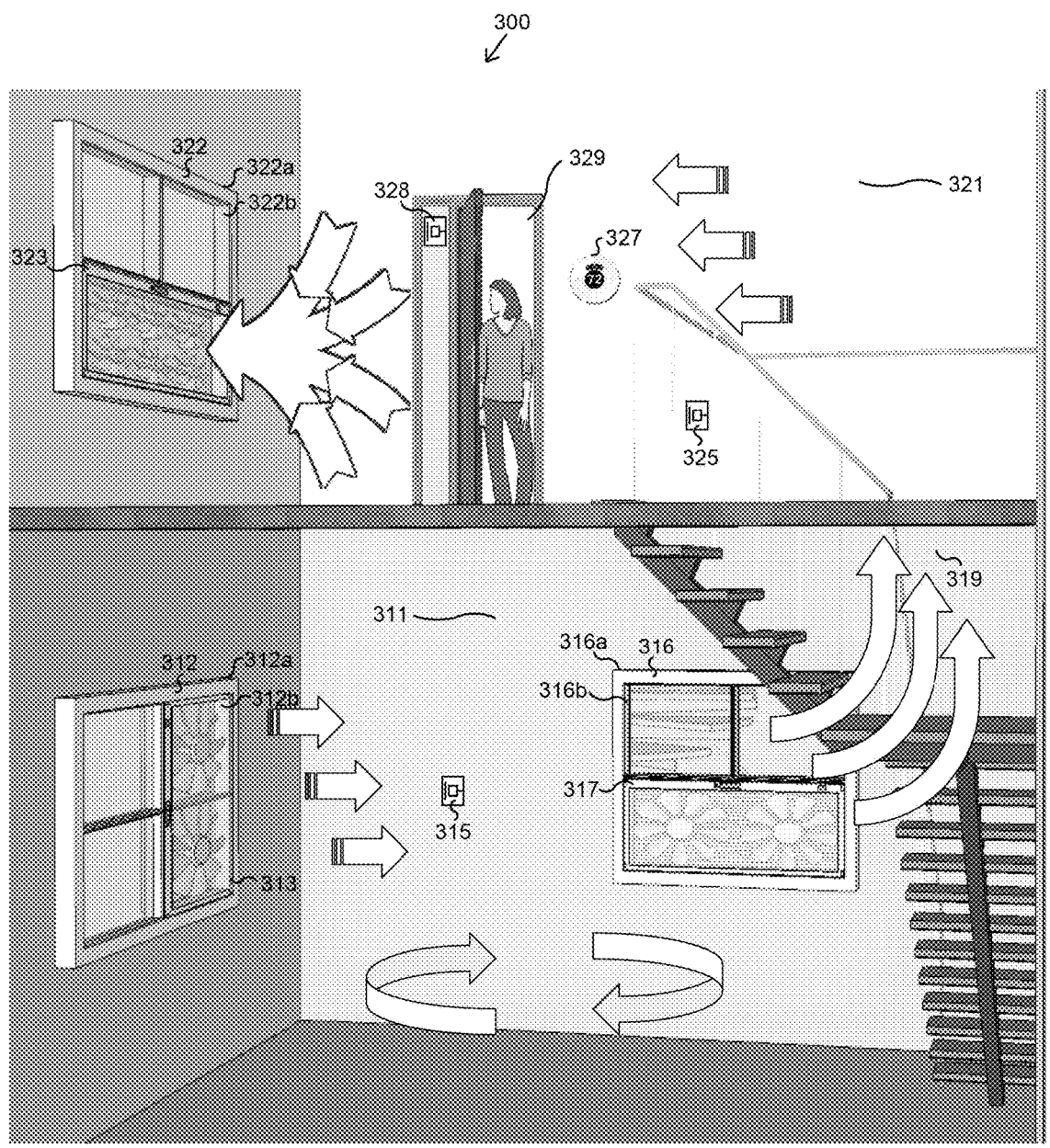
FIG. 3 illustrates an exemplary embodiment of the SFV device of FIGS. 1A-1C being implemented within a space of a structure.

In some exemplary embodiments, the housing 101 and grille 106b of the SFV device 100 may, for example, include a substantially flat surface, so that the SFV device 100 minimally extends out from the window frame and window casing. The faceplate 106, grille 106b, and back face 150, may all be substantially thin and flat to be flush with the housing 101 without contacting the window/insect screen. Moreover, in place of the cover 107, a plurality of screens 105 may be attached to the front face 110 and back face 150 to prevent obstructing the fan 103. As shown in FIG. 3, the front face 110 of the SFV device 100 when mounted on a window frame (e.g. of window 312, 316, and 322) may be substantially parallel to the top surface of a sash stop 312a, 316a, 322a or beneath the top surface of the inside casing 312b, 316b, 322b of the window 312, 316, and 322. As shown in FIG. 3, the SFV device 100 may be substantially flush with or recessed into a window 312, 316, 322. Moreover, the profile of the SFV device 100 may be such that the back face 150 does not protrude out of the window frame and into an exterior environment.

The sash stops 312a, 316a, and 322a define the depth of windows 312, 316, and 322, respectively. SFV devices 313, 317, and 323 may extend outside of the sash stop 312a. 316a, and 322a in either direction or may be flush with top surface of the inside casing 312b, 316b, and 322b (as shown in FIG. 3). SFV devices 313, 317, and 323 may extend outside of the sash stops 312, 316, and 322 away from and outside of subspace 311 and 321 (i.e. outside of window frames) or protrude above the top surface of the inside casing 312b, 316b, and 322b (i.e. above the front side of the window frame) and into subspace 311 and 321.

The cover 107 and faceplate 106 may be attached to a single motor 108 or separate motors and operated to slide, move, or rotate to create a dual seal between the exterior environment and the interior environment. The faceplate 106 may be detached from the SFV device 100 to be cleaned, replaced, or repaired. Similarly, the cover 107 may be detached from the SFV device 100 to be cleaned, repaired, or replaced with the same or different cover.

In some exemplary embodiments, the motor 108 on side face 140 may be located instead in the back face 150 to operate the cover 107. The cover 107 may be directly attached to the back face 150 using vertical louver rods instead of horizontal louver rods 207b as shown in FIGS. 2A-2E.

In some exemplary embodiments, the back face 150 may be omitted and substituted with a detachable motor 108 and cover 107. The detachable motor 108 and cover 107 may serve as the back face 150 for the housing 101. Thus, the back face 150 may be omitted or replaced with the detachable motor 108 and cover 107.

In some exemplary embodiments, the back face 150 may include a motor for operating cover 107, and the motor 108 on the side face 140 may be replaced with tracks that allow louvers 207a and louver rods 207b of the cover 107 to slide up and down the housing 101 (e.g. functioning as window blinds) to open, partially open, and close.

The controller 114 may automatically managed operation of the motor 208 and louvers 207a using weather station information collected through wireless network, exterior and interior weather information collected from the thermostat, rain sensor (rain intensity detector), and internal and external sensors. The housing 101 may include a rain intensity sensor communicably coupled to the controller 114. The rain intensity sensor may transmit detected rainfall, moisture, or humidity from an exterior environment to the controller 114, the controller 114 may then process instructions to operate louvers 207a, louver rods 207b, movable portions 106c of the grille 106b to insulate the interior environment from the exterior environment.

The faceplate 106, grille 106b, and cover 107 of the SFV device 100 may be used together to insulate the exterior environment from the interior environment when the SFV is not in use, when the HVAC cooling, heating, or ventilation is on in a building, when the exterior temperature is too hot or too cold, or when allergen or pollution levels are too high in the exterior environment.

Lastly, SFV device 100 may include a dispenser 116. The dispenser may hold a liquid or solid material, for example, water, fragrant essential oils, peppermint leaves, aroma compounds, fixatives, and solvents. Controller 114 may control dispenser 116 to dispense a pleasant scent or aroma before, after, or during operation of the SFV device 100. The dispenser 116 may include anti-bacterial or odor fighting agents that may be used to sanitize a room or a building. When sensor modules 111 detect poor air quality or pollution, the controller 114 may dispense a predetermined amount of liquid from the dispenser 116 into a room or building and operate the SFV device 100 to sanitize the air in the room or building. The dispenser 116 may also be used as a compartment to store solid materials, for example, incense or charcoal briquettes for non-toxic or inexpensive odor removal. The dispenser 116 may also be used as a compartment to store incense or charcoal briquettes for non-toxic or inexpensive odor removal. Moreover, dispenser 116 may be a diffuser to diffuse medicinal oils, for example, a eucalyptus diffuser to help individuals with asthma or respiratory conditions. The dispenser 116 may be an accessory or attachment that a user can specifically choose to attach to the housing 101 of the SFV device 100, the dispenser 116 may also be built into the housing 101.

FIGS. 2A-2E illustrate an exemplary embodiment of the cover 107 in the SFV device 100 used to insulate the exterior environment from the interior environment. The cover 207 includes a plurality of louvers 207a and a plurality of louver rods 207b. The louver rods 207b are connected to the louvers 207a and are operated by at least one motor 208 to move, slide, or rotate the plurality of louvers 207a to an open, closed, or partially open position. In some exemplary embodiments, the SFV device 100 may include two or more motors 208, each motor 208 attached at each of the side faces 140, or alternatively, one motor 208 may be positioned at one side face 140 and another motor 208 may be positioned on the back face 150.

As shown in FIGS. 2B-2C, the louvers 207a include two surfaces, a plate surface 2070a and a screen surface 2070b. The plate surface 2070a is a substantially nonpermeable surface composed of any metal (e.g. aluminum, copper, bronze, etc.), fabric, plastic, plastic composites, fiberglass, micro mesh material, or the like. Visually, the plate surface 2070a is substantially opaque or translucent and acts to insulate the exterior environment from the interior environment. The screen surface 2070b is a substantially permeable surface composed of any metal (e.g. aluminum, copper, bronze, etc.), fabric, wire mesh materials, plastic, plastic composites, fiberglass, micro mesh material, or the like. Visually, the screen, surface 2070a is substantially clear or transparent and acts as a window screen or insect screen. The screen surface 2070b and the plate surface 2070a may be made of the same or similar materials as the housing 101.

The plate surface 2070a comprises of an exterior surface 2071a and an interior surface 2072a. The exterior surface 2071a facing away from the louver rod 207b, the interior surface 2072a opposite to the exterior surface 2071a and facing towards the louver rod 207b.

The screen surface 2070b comprises of an exterior surface 2071b and an interior surface 2072b. The exterior surface 2071b facing away from the louver rod 207b, the interior surface 2072b opposite to the exterior surface 2071b and facing towards the louver rod 207b.

In FIGS. 2C-2E, the screen surface 2070b, plate surface 2070a, and louver rod 207b rotate about the same axis. However, in some exemplary embodiments the plate surface 2070a and the screen surface 2070b may be attached to different louver rods 207b and rotate about perpendicular axes, diagonal axes, or different axes. For example, the screen surface 2070b may be fixed, to a first louver rod 207b, both extending vertically along the side surfaces 140 of the housing 101. The plate surface 2070a may be fixed to a second louver rod 207b, both extending horizontally along the top surface 120 and bottom surface 130 of the housing 101. The screen surface 2070b and first louver rod 207b may rotate about an axis perpendicular to the top surface 120 and bottom surface 130 of housing 101, and, the plate surface 207b and second louver rod 207b may rotate about an axis parallel to the top surface 120 and bottom surface 130 of housing 101.

FIGS. 2D-2E illustrate an exemplary embodiment of opening and closing the exemplary louvers 207a of the SFV device 100. FIG. 2D illustrates a plan view of the motion of the louvers 207a, FIG. 2E illustrates a cross-sectional view of the louvers 207a being opened and closed. The louvers 207a may rotate either clockwise or counter-clockwise from an open to a close position. The louvers 207a are opened when screen surface 2070b is parallel to the from surface 110 and the back surface 150 of housing 101. The louvers 207a are closed (i.e. the cover 207 is closed) when the plate surface 2070a is parallel to the front surface 110 and the back surface 150 of housing 101. In FIG. 2D the louvers 207a start from a closed position and rotate to an open position. In FIG. 2E the louvers 207a start from an open position and rotate to a closed position.

The louvers 207a of SFV device 100 may be moved to an open position, a closed position, a partially opened position or partially closed position. When in an open position, the screen surface 2070b of louvers 207a are parallel to the front surface 110 and back surface 150. In the open position, the screen surface 2070b allows air to flow in or out of the SFV device 100 (as shown in FIGS. 1C and 5). When in a closed position, the plate surface 2070a of louvers 207a are parallel to the front surface 110 and back surface 150. In the closed position, the plate surface 2070a blocks air from flowing in or out of the SFV device 100 (as shown in FIGS. 1A-1B).

When in a partially opened position, the plate surface 2070a and screen surface 2070b of the louvers 207a are no longer parallel to the front surface 110 and back surface 150. In the partially opened position, the plate surface 2070a and screen surface 2070b allow air to partially flow in or out of the SFV device 100 (e.g. allowing wind to enter through SFV device 100).

When in a partially closed position, the plate surface 2070a and screen surface 2070b of the louvers 207a are approximately parallel to the front surface 110 and back surface 150. In the partially closed position, the plate surface 2070a and screen surface 2070b substantially reduce the air flow in or out of the SFV device 100 (e.g. limiting cold air from entering through SFV device 100).

The movable portions 106c of SFV device 100 may be moved to an open position, a closed position, a partially opened position or partially closed position. When in an open position, the movable portions 106c maximally expose the aperture 106a of the faceplate 106 (as shown in the right half of FIG. 1C). In the open position the movable portions 106c allow the maximum amount of air to flow in or out of the SFV device 100. When in a closed position, the movable portions 106c cover the aperture 106a of the faceplate 106. In the closed position the movable portions 106c restrict air from flowing in or out of the SFV device 100 (as shown in the left half of FIG. 1C).

When in a partially opened position, the movable portions 106c partially expose aperture 106a. In the partially opened position, the openness of the movable portions 106c may be defined by a percentage of exposure of the aperture 106a, the percentage being between about 10-99%. Similarly, when in a partially closed position, the movable portions 106c substantially limit the exposure of aperture 106a. In the partially closed position, the openness of the movable portions 106c may be defined by a percentage of exposure of the aperture 106a, the percentage being between about 0-9%. As described above, movable portions 106a further allow for either a substantially reduction in air flow in or out of the SFV device 100, or a more finer adjustment to limit wind or cold air from flowing in or out of SFV device 100.

FIG. 3 illustrates an exemplary embodiment of an SFV device in a building 300. The building 300 may include, for example, a plurality of subspaces 311 and 321 (e.g. interior or exterior divisions of a building; rooms, floors, walkways, etc.), a plurality of windows 312, 316, and 322, and a plurality of openings 319 and 329. As shown in FIG. 3, fresh air from an exterior environment is directed across subspace 311, through opening 319, across subspace 321, and out through window 322 or opening 329. FIG. 3 illustrates an exemplary embodiment of using SFV device 313, SFV device 317, or SFV device 323, the examples described herein for circulating air and monitoring and controlling environmental conditions need not be limited only to those disclosed in FIG. 3.

In FIG. 3, subspace 311 and subspace 321 are shown as example spaces for monitoring and controlling environmental conditions in building 300. The subspaces 311 and 321 described herein for a building need not be limited to those disclosed in FIG. 3, subspaces may be on the same floor, subspaces may be on different floors, subspaces, may share one or more walls, subspaces may be spaced apart from each and sharing no walls, etc. Each subspace 311 and subspace 321 may include one or more SFV devices 313, 317, and 323, one or more sensor modules 315 and 325, one or more exterior sensor modules 328, and one or more thermostats 327.

Each SFV device 313, 317, and 323 may be communicably coupled to one or more of the following: the one or more sensor modules 315, 325, and 328, the one or more thermostats 327, one or more smart fans, standing fans, pedestal and ceiling fans, and SFV devices, one or more remote computing devices 531, servers 511 (as shown in FIG. 5), portable computing devices, computers, etc. Further, each SFV device 313, 317, and 323 may collect and share interior and exterior climate information from the one or more sensor modules 315, 325, and 328, the one or more thermostats 327, the one or more smart fans (e.g. smart standing, pedestal, and ceiling fans) and SFV devices, and the one or more remote computing devices 531, servers 511 (as shown in FIG. 5), portable computing devices, computers, etc.

As an example, SFV device 313 is installed in a horizontally opening window 312 in subspace 311, while SFV device 317 is installed in a vertically opening window 316 in subspace 311. Interior and exterior environmental conditions collected by the one or more sensor modules 315, 325, and 328, one or more thermostats 327, remote computing devices 531, and server 511 (as shown in FIG. 5) are sent to the SFV device 313, 317, and 323. The SFV device 313 may operate as an exhaust fan to move warm, cold, humid, or stale air out from subspace 311 and into an exterior environment. The SFV device 313 may also operate as an intake fan to move fresh, cool, or warm, air from an exterior environment into subspace 311. SFV devices 313, 317, and 323 may be connected to each other and other smart fans (e.g. smart standing, pedestal, and ceiling fans) in a building to function together to: move warm, cold, humid, or stale air out from one subspace and to an exterior environment, move fresh air in from an exterior environment into one or more subspaces 311 or 321, or recirculate air within one or more subspaces 311 or 321 without bringing air in from an exterior environment (e.g. operating as a pedestal fan or standing fan).

In the case where subspace 311 does not have an opening 319 or opening 329, the SFV device 313 and SFV device 317 may operate individually or together to: move warm, cold, humid, or stale air out from subspace 311 and into an exterior environment, move fresh air in from an exterior environment into subspace 311, or recirculate air within subspace 311 without bringing air in from an exterior environment (e.g. operating as a pedestal fan or standing fan).

For example, sensor module 315 may, upon determining interior environmental conditions in subspace 311 to be above a threshold humidity or temperature (e.g. 86° F.), communicate detected environmental conditions to SFV device 313 and SFV device 317. The SFV devices 313 and 317 may be configured to both open and operate in exhaust mode to move the humid and warm air out to an exterior environment. After a predetermined period of time, or once sensor module 315 determines the temperature and humidity in subspace 311 to be at a certain user defined, level, SFV devices 313 and 317 close and turn off.

The sensor module 315 may determine differentials (deltas) of any detected or collected environmental condition (e.g. temperature, humidity, etc.) in an interior and/or exterior environment. For example, delta T, or the difference of temperature between two measuring points which differ in time or spatial position. Differential temperature may be used, for example, to determine or facilitate efficient cooling, heating, or ventilation.

The SFV devices 313 and 317 may further obtain interior and exterior climate conditions from any of the one or more sensor modules 315, 325, and 328, one or more thermostats 327, remote computing devices 531, and server 511, etc. Upon determining suitable exterior environmental conditions (e.g. cool, clean, dry air), SFV devices 313 and 317 may both open and operate in intake mode to move cool air into subspace 311. Alternatively, the SFV device 313 may operate in intake mode to push exterior air into subspace 311 while SFV device 317 operates in exhaust mode to move interior air into the exterior environment. Further, SFV devices 313 and 317 may close and operate in intake more to circulate air in subspace 311 (e.g. operating as a standing or pedestal fan).

In addition to sensor module 315, SFV devices 313 and 317 may each include sensor modules 111 installed on or within housing as described in FIG. 1. The sensor modules 111 of each SFV device 313, 317, and 323 may be configured to share and substantiate detect environmental conditions with other sensor modules, thermostats, smart fans, and SFV devices. For example, if smoke or air pollution is detected in subspace 311 by sensor module 111 of SFV device 317, the SFV device 317 may communicate with other SFV devices 313 and 323, sensor modules 315, 325, and 328, one or more thermostats 327, remote computing devices 531, server 511, etc., to function collectively to detect abnormal temperatures in the subspaces 311 and/or 321 that may signal a fire. If a fire is detected, SFV devices 313 and 317 may close to cut off oxygen to the building to prevent a fire from spreading. If a fire is not detected, SFV devices 313 and 317 may open to move the smoke or air pollution to an exterior environment. In certain circumstances, SFV devices 313 and 317 may be configure to move smoke out of a building to aid firefighters in entering the building and residents from exiting the building.

Similarly, in the case where subspace 321 does not have an opening 329 or opening 319, the SFV device 323 may operate to: move warm, cold, humid, or stale air out from subspace 321 and into an exterior environment, move fresh air in from an exterior environment into subspace 321, or recirculate air within subspace 321 without bringing air in from an exterior environment (e.g. operating as a pedestal fan or standing fan).

For example, sensor module 325, sensor module 328, and thermostat 327 may determine interior environmental conditions in subspace 321 to be stale and warm and exterior environmental conditions to be hot and dry. The SFV device 323 may determine, based on weather patterns as communicated by one or more sensor modules 315, 325, and 328, one or more thermostats 327, remote computing devices 531, server 511, one or more SFV devices 313 and 317, etc., and time of day, whether to operate in exhaust mode or intake mode to circulate air in subspace 321. Upon receiving interior and exterior environmental conditions, the SFV device 323 may open and operate in exhaust mode to move the stale and warm air out to an exterior environment. The SFV device 323 may also be configured to follow a seasonal schedule to exchange the outside air with the inside air. The SFV device 323 may also be configured to operate in addition to proximity data about a user as collected from one or more thermostats 327, remote computing devices 531, and servers 511. For example, the SFV device 323 may operate to remove stale and humid air in subspace 321 in response to the location of a user or individual from building 300, in addition to seasonal schedule, time of day, weather patterns, and user preferences and habits, etc. The SFV device 323 may be configure to efficiently control cooling and ventilation in a building. For example, prior to the arrival of the individual, one or more SFV devices 313, 317, and 323 may operate to move stale, warm, or cold air out of the building 300 prior to the thermostat 327 turning on the HVAC cooling, heating, or ventilation, ceiling fan, or other fans to cool subspaces 321 and 311 in the building 300.

Thus, the user or individual may define a work schedule or school schedule and set the SFV devices 313, 317, and 323 to operate when they return from work or school. The SFV devices 313, 317, and 323 may be scheduled to remove humidity in subspaces 311 and 321 prior to their arrival. The SFV devices 313, 317, and 323 may operate using a user defined scheduling system to optimize the use of HVAC cooling by operating the fans of the SFV to redirect warm air outside and then operate HVAC cooling or ventilation to cool the living space.

In the above exemplary embodiments, the SFV devices 313, 317, and 323 may each be configured to operate individually and only when a threshold is reached, or when a predefined level above a threshold is reached for a predetermined amount of time. The SFV devices 313, 317, and 323 may be operated based on a scheduled single event, a series of events, or a sequence of events. The SFV devices 313, 317, and 323 may also be communicably coupled to one or more thermostats 327, remote computing devices 531, or servers 511 to acquire interior and local weather information. The SFV devices 313, 317, and 323 may learn and adjust fan operation based on weather information communicated from interior sensors 315, 315, exterior sensors 328, and other smart devices (e.g. a smart thermostat 327). SFV devices 313, 317, and 323 may individually operate in response to learned humidity, air quality, or temperature patterns throughout the day. Moreover, SFV device 313, 317, and 323 may close or open to insulate the exterior environment from the interior environment, for example, to prevent leaking of cool air from the AC out from the building 300 and into the exterior environment because of an ineffective interior and exterior window fan insulation.

In the case where subspace 311 and subspace 321 have or share an opening 319 or opening 329, the SFV devices or smart fans (e.g. SFV devices 313, 317, and 323) in building 300 may function together to: move warm, cold, humid, or stale air out from one subspace and to an exterior environment, move fresh air in from an exterior environment into one or more subspaces 311 or 321, or recirculate air within one or more subspaces 311 or 321 without bringing air in from an exterior environment (e.g. operating as a pedestal fan or standing fan).

SFV devices 313, 317, 323 may operate together to move fresh air from one subspace to another and circulate the air in the room, for example, moving air out from subspace 321, through opening 319 and out of subspace 311 through window 312. Similarly, SFV devices 313, 317, and 323 may operate to direct fresh air from, for example, moving air from subspace 321 into subspace 311. SFV devices 313 and 317 may then close and operate in intake mode and function as a standing fan. SFV devices 313, 317, and 323 may include visual, audio, and pressure sensors to assist in determining triggers or event triggers (audio, motion, visual, etc.) of whether subspaces 311 or 312 have a doorway, a stairway, or an open window and/or whether there is a change in room pressure (e.g. from opening a door or movable barrier).

These triggers may be trained into sensor modules 315 and 325 or SFV devices 313, 317, 323 to detect opening and closing of a door or window (e.g. training condition sensors 455 (e.g. pressure sensor), microphone 452 (sound), and motion sensors 457 to turn on HVAC fan, cooling, or heating, instead of using the camera 459 of SFV device 401 to detect a window opening). The individual may also define opening and closing of a door/window (e.g. defining a trigger) within subspaces 311 or 321. The SFV device 401 may further include programming to learn individual behavior and preferences to further aid in detecting opening or closing of a windows and doors in subspaces 311, 321, or building 300.

Moreover, pressure sensors (e.g. condition sensors 355) may be used in combination with visual and audio sensors to assist, in determining whether the space has a doorway or open window and/or whether there is an opening (e.g. a stairway, or from opening a door or movable barrier). For example, determining a pressure variation or differential in a space 300 from opening a window or a door.

SFV devices 313, 317, 323 may operate a dispenser 116 throughout the building 300 to dispense a pleasant scent or aroma, sanitize subspaces 311 or 321, or help individuals with asthma or respiratory conditions. SFV devices 313, 317, 323 may dispense or facilitate dispersal of the contents of the dispenser 116 from one subspace 311 to the other subspace 321 before, after, or during fan operation. When sensor modules 315, 325, 328, or thermostat 327 detect poor air quality or pollution, the SFV devices 313, 317, 323 may dispense, diffuse, or disperse a predetermined amount of material from the dispenser 116 through subspaces 311 and 321 or building 300 and operate the fans or other smart fans to condition the interior or exterior air.

Figure 4:
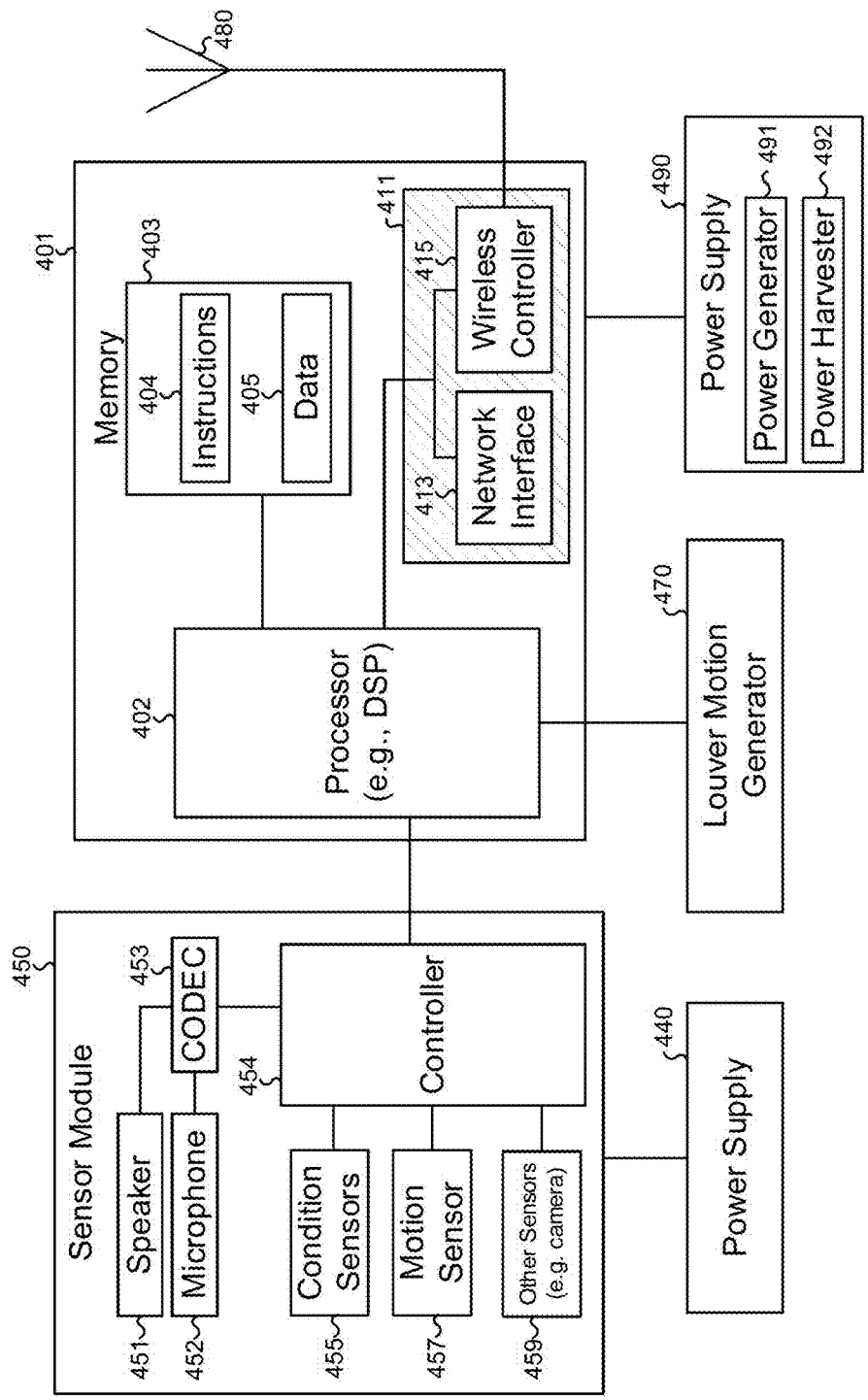
FIG. 4 illustrates an exemplary embodiment of the internal components of the SFV device of FIGS. 1A-1C.

FIG. 4 illustrates conceptually an exemplary SFV device 401 with which some exemplary embodiments of the present disclosure may be implemented. The SFV device 401 may be any sort of electronic device that transmits signals over a network, such as electronic devices embedded in smart appliances and other smart systems. The SFV device 401 may include various types of computer readable media (e.g., a non-transitory computer-readable medium) and interfaces for various other types of computer readable media.

The SFV device 401 includes a processor 402 and memory/storage 403. The processor 402 may retrieve and execute instructions 404 and/or data 405 from memory/storage 403 to perform the processes of the present disclosure. Processor 402 may be a single processor, a multi-core processor, or multiple processors in different implementations.

Figure 6A:
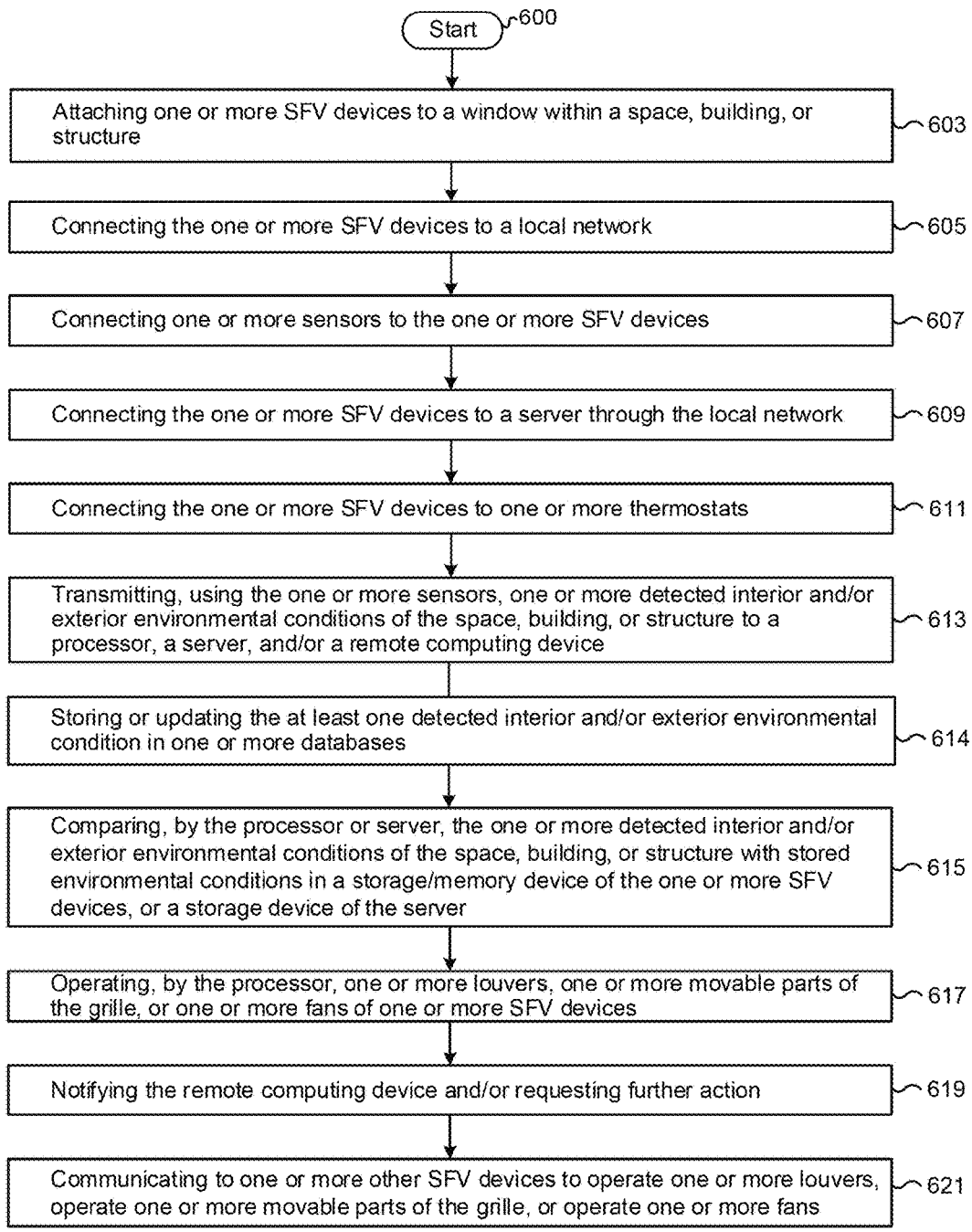
FIG. 6A illustrates an exemplary embodiment of a flowchart of interactions and operations of the SFV device of FIGS. 1A-1C.
Figure 6B:
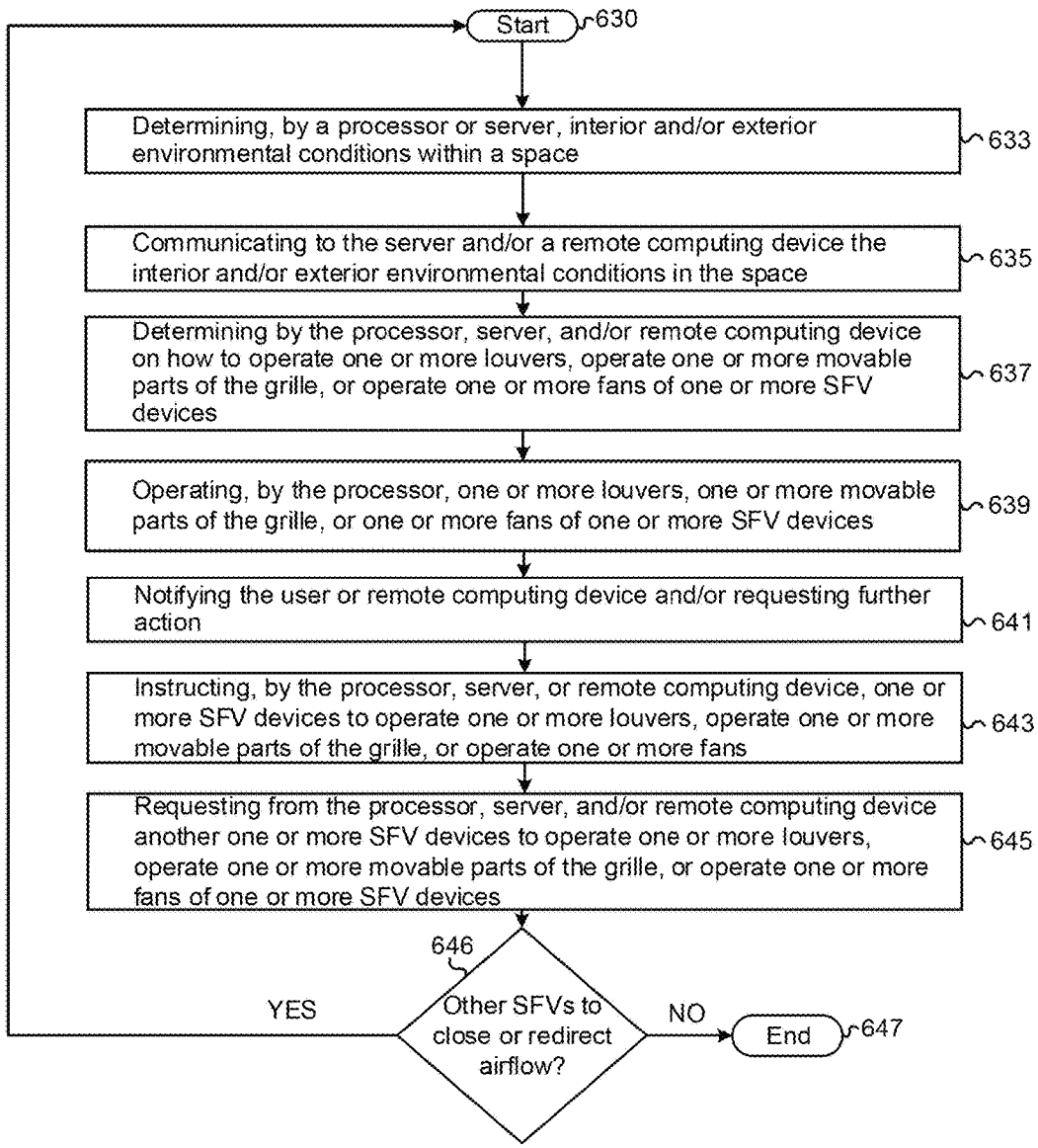
FIG. 6B illustrates another exemplary embodiment of a flowchart of interactions and operations of the SFV device of FIGS. 1A-1C.

Referring to FIGS. 4-5, instructions and data for operating SFV device 401 may be stored on, transmitted from, or received by any computer-readable storage medium memory/storage 512 of server 511) storing data (e.g., data 405) that is accessible to a processor (e.g., the processor of server 511) during modes of operation of the SFV 401. The SFV 401 may access and execute instructions 404 and/or data 405 stored on any remote computing device 531. The data 405 may be a method instruction as depicted in FIGS. 6A-6C. The method instructions are executable by processor 402, where the instructions include steps on how to operate and configure the louvers of the SFV device 401.

The memory/storage 403 may include a dynamic random-access memory (DRAM) and/or a read-only memory (ROM). Memory/storage 403 may provide a temporary location to store data 405 and instructions 404 retrieved and processed by processor 402. Memory/storage 403 may include a non-volatile read-and-write memory that stores data 405 and instructions 404, even when Wi-Fi/Internet is off, that may be retrieved and processed by processor 402. For example, memory/storage 403 may include magnetic, solid state and/or optical media, memory/storage 403 may be a single or multiple memory units as necessary. The memory/storage 403 stores all collected visual, audio, textual, voice, motion, heat, temperature, humidity, air quality, proximity, etc., information provided directly from the SFV device 401 or the sensor module(s) 450, or indirectly through a wireless connection to another electronic device (s), sensor(s), or sensor module(s) 450.

SFV device 401 couples to a network through a network interface 413. In some aspects, network interface 413 is a machine-interface. In this manner, the SFV device 401 may be a part of a network of computers, a local area network (LAN), a wide area network (WAN), or an Intranet, or a network of networks, for example, the Internet. A wireless controller 415 may be coupled to the processor 402. The wireless controller 415 may be further coupled to an antenna 480. The network module 411 may be integrated as system-in-package or system-on-chip device and/or collectively defined as having the network interface 413 and, wireless controller 415. Network interface 413 and wireless controller 415 integrated into the network module 411 and being coupled to an antenna 480. Any or all components of SFV device 401 may be used in conjunction with the subject disclosure. The network interface 413 may include cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication.

A sensor module 450 may be communicably coupled to the SFV device 401. The sensor module 450 may be coupled to SFV device 401, formed on SFV device 401, or remotely connected to SFV device 401. The sensor module 450 may include and control various sensor components for sensing interior and exterior environmental conditions (e.g. temperature, humidity, air quality, smoke, CO, $CO_2$, etc.). Sensor components may monitor environmental conditions by using one or more condition sensors 455, motion sensors 457, and other sensors 459 (e.g. heat, occupancy, lighting, ambient lighting, etc.). A combination of sensor components may be implemented to provide comprehensive monitoring or improved accuracy in monitoring interior and exterior environmental conditions. Moreover, individual sensor components from sensor module 450 may be separately coupled to SFV device 401, formed on SFV device 401, or remotely connected to SFV device 401. In some embodiments, some sensor components may be grouped together to form a second or additional sensor modules. In certain embodiments, some sensor components of sensor module 450 (e.g. motion sensor 457) may instead be formed on the SFV device 401. Further, in some embodiments, some sensor components of sensor module 450 (e.g. infrared sensor, other sensors 459) may also be formed on the SFV device 401 to provide additional or supplemental monitoring.

Condition sensors 455 may detect and collect information about environmental conditions in a subspace 311 and 321 or a building 300 or structure. Condition sensors 455 may include but not be limited to, for example, temperature sensor, ambient light sensor, humidity sensor, barometer sensor, air quality sensor (e.g. for detecting allergens, gas, pollution, pollen, etc.), infrared sensor, $CO_2$ sensor, CO sensor, piezoelectric sensor, airflow or airspeed sensor to determine air speed through HVAC system ducting and SFV device 401. The sensor components 455, 457, 459, etc., (e.g. airflow or airspeed sensor) may be used by the processor 402 of the SFV device 401 to determine how to distribute airflow in subspaces 311 and 321 and building 300, when to activate, deactivate, reverse, or control the speed of fan 103, when to open, close, or partially open the cover 107, louvers 207a, louvers rods 207b, movable portions 106c of grille 106b, and when to control of one or more SFV devices 401 to effectively ventilate a subspace 311 and 321 or building 300.

The condition sensors 455 may determine differentials (deltas) of any detected or collected environmental condition (e.g. temperature, humidity, etc.) in an interior and/or exterior environment. For example, delta T, or the difference of temperature between two measuring points which differ in time or spatial position. Differential temperature may be used, for example, to determine or facilitate efficient cooling, heating, or ventilation.

Other sensors 459 may detect and collect information about environmental features in a subspace 181-183, a space 300, a building or structure. Other sensors 459 may include, for example, a proximity sensor, occupancy sensor, ambient light sensor. Microphone 452 and speaker 451 may also be used to control SFV device 401 or verify the status of the fan 103, cover 107, louvers 207a, louvers rods 207b, movable portions 106c of grille 106b, and other connected or disconnected SFV devices 401 to effectively ventilate a subspace 311 and 321 or building 300.

The sensor module 450 includes a controller 454 for controller the sensors and processing data collected by the sensors. Controller 454 may include a processor, memory/storage device (storing sensor instructions, settings, etc.), and a network module wireless chip for communicating with SFV device 401. Controller 454 may send measured/detected environmental, conditions to the processor 402 for further processing. The sensor module 450 may be powered by a power supply 440. The power from the power supply 440 may be provided by disposable batteries or rechargeable batteries, for example, nickel cadmium (NiCd), lithium (Li), AA, AAA, and/or rechargeable capacitors, for example, supercapacitors (SC) or ultracapacitors. The power supply 440 may supply power to sensor module 450 by, for example, a power adapter for connecting to an outlet, a solar panels/cell, or any other renewable/alternative power supply source. The sensor module 450 may use multiple battery types, for example, using a coin cell battery to operate some sensor components or to provide auxiliary power.

The sensor module 450 may include a speaker 451 and microphone 452 for communicating with an individual 151 or receiving control commands from an individual 151 positioned within a vicinity of the SFV device 401. The speaker 451 and microphone 452 may be coupled to a CODEC 453. The coder/decoder (CODEC) 453 may also be coupled to the processor 402 through a controller 454. The processor 402 may provide audio information captured from the microphone 452 to any electronic device (e.g. server 511 or smart phone 532) as shown in FIG. 5, that may facilitate communication with an individual 151 positioned within a vicinity of the SFV device 401 through the speaker 451.

In an exemplary embodiment, the SFV device 401 and/or sensor module 450 comprises at least one motion sensor 457 for detecting motion information. For example, motion sensor 457 may detect moving objects and/or pedestrians. The motion sensor 457 may be a passive infrared motion detector. Infrared motion sensors are also known as PIR (passive infrared) motion sensors or simply PIR sensors. Such detectors have about a 120° arc and about a 50-foot range detection zone. In the case where an increased field of view of motion detection or more accurate motion detection is required, two or more motion detectors may be used.

Suitable alternate motion detectors may also be used, such as ultrasonic, optical, microwave, or video motion detectors. Additional alternative types of motion detectors may also be used to sense intrusion including laser scanning or frequency sensitive detectors, commonly referred to as "glass breaks". Motion sensor 457 may include image sensors having, any type of low light level imaging sensors used for surveillance and unmanned monitoring in daylight to complete darkness, for example, low-light complementary metal-oxide-semiconductor (CMOS) or charge-coupled device (CCD) image sensors.

The motion sensor 457 may also be complemented with other devices to aid in detecting motion such as, for example, photocell sensors, cadmium-sulfide (CdS) cells, light-dependent resistors (LDR), and photoresistors. In addition to motion sensors, the photo cell sensors may be used to determine if there something in front of a sensor or a series of sensors that block light. The sensitivity of the motion sensor and photocell may be adjusted through, for example, an application on an electronic device (e.g. smart device 534 or laptop 531). Also, a server or application may decide if the situation or application warrants night use or twenty-four-hour operation of motion detection through alternate means such as photocell sensors. If night operation is selected, then the server or application will process detected photocell information to determine if motion was detected.

The sensor module 450 may include any number of other detectors or other sensors 459. Examples of other sensors 459 that may be used include, by way of illustration only and not by way of limitation, temperature sensors, video cameras, audio recorders, motion sensors, ambient light sensors, light sensors, humidity sensors, smoke detectors, and other sensors, such as for example, an Electric Field Proximity Sensing (EFPS) sensor to determine whether a person or object is nearby that is behind a wall.

The sensor module 450 may determine environmental differentials (deltas) of any detected or collected environmental condition (e.g. temperature, humidity, etc.) in an interior and/or exterior environment. For example, delta T, or the difference of temperature between two measuring points which differ in time or spatial position. Differential temperature may be used, for example, to determine or facilitate efficient cooling, heating, or ventilation.

To illustrate one exemplary embodiment, the other sensors 459 may be a camera (hereinafter, camera 459) for capturing visual information such as video and still images of the surrounding environment. The camera 459 may be coupled to a controller 454 for controlling the camera to capture visual information that may be sent to the processor 402. The controller 454 may be coupled to the processor 402 for processing visual information. The processor 402 may provide visual information captured from the camera 459 to any electronic device (e.g. server 511 or remote computing device 531) which may facilitate interaction or communication with a person or an object positioned within a vicinity of the SFV device 401. The camera 459 may be any optical instrument for recording or capturing images that may be stored locally, transmitted to another location, or both. The images may be still photographs, or sequences of images forming videos or movies. The camera 459 may be any type of camera, for example, high-end professional camera type, digital camera, panoramic camera, fish-eye lens type camera, multi-lens type camera, VR camera, etc.

The SFV 401 includes a power supply 490 having a power generator 491 as a power source. The power generator 491 may include rechargeable batteries, for example, nickel cadmium (NiCd), (Li), AA, AAA, and/or rechargeable capacitors, for example, supercapacitors (SC) or ultracapacitors. The power generator 491 may comprise of multiple battery types, for example, using a coin cell battery to operate some sensor components or to provide auxiliary power, while using a rechargeable Li battery to provide power for operating the fan 103, cover 107, louvers 207a, louvers rods 207b, movable portions 106c of grille 106b, etc. Moreover, the power supply may include a power harvester 492 such as wind turbines/electric generator for charging rechargeable batteries or capacitors to prolong primary and/or auxiliary power by using wind turbines. The SFV 401 may be powered by rechargeable batteries, or wind turbines, or a combination of these and other power sources. In certain embodiments, the wind turbines may function in reverse to pull air out from the space. The processor 402 and/or controller 454 may periodically store and/or access data 405 and instructions 404 in memory 403 for determining how to effectively turn on wind turbines to charge rechargeable batteries when necessary.

The louver motion generator 470 may be powered using a power supply 490 and controlled through processor 402. The processor controls the louver motion generator 470 to slide, turn, or rotate louvers 203 and 205. The louver motion generator 470 may include a motor (e.g. a DC motor) or circuitry to for driving louvers 203 and 205 to move. In some embodiments, the louver motion generator 470 may be made to open or close using only power harvester 492. The louver motion generator 470 may control any of the fan 103, cover 107, louvers 207a, louvers rods 207b, movable portions 106c of grille 106b.

FIG. 5 illustrates an exemplary embodiment of the SFV device 501 wirelessly communicating with other electronic devices through, for example, a wireless router 521. The electronic devices may be, for example, smart thermostats 541, laptops 533, portable devices 534, smart phones 532, and server 511 and/or server storage 512. SFV device may also connect to other smart home devices comprising of electronic door locks, light bulbs, smart switches, smart outlets. IP cameras, smoke detectors, smart refrigerators, smart washer/dryer, smart devices powered on solar energy, etc.

The SFV device 501 may be configured to wirelessly communicate and cooperate with smart thermostat 541 (and other smart devices) in real-time. Additionally, the SFV device 501 may communicate with smart thermostats 541 and other sensors, sensor modules, and smart devices based on stored visual, motion, audio information, and/or interior and exterior environmental conditions in storage 502.

The processor 402 and/or server 511 may open, close, or partially open the cover 207, louvers 207a, louvers rods 207b, grille 106b and movable portions 106c based on a measured physical quantity from the interior and/exterior environment as collected by the smart thermostat 541, sensor module 450, or smart device and stored as visual, motion, audio information, and/or interior and exterior environmental conditions in storage 512.

The processor 402 and/or server 511 may activate, deactivate, reverse, or control the speed of operation of fan 103 based on a measured physical quantity from the interior and/exterior environment as collected by the smart thermostat 541, sensor module 450, or smart device and stored as visual, motion, audio information, and/or interior and exterior environmental conditions in storage 512.

Effectively, smart thermostat 541 and/or smart devices cooperate with or supplement sensor modules 450 to provide comprehensive information of interior and exterior environmental conditions in one or more subspaces 311 and 321 and building 300.

The SFV device 501 may be configured to communicate between the above electronic devices (e.g. security devices, smart thermostat, smart devices, or smart appliances) by sending and retrieving interior and exterior environmental conditions, proximity information, schedule information, textual (e.g. email, SMS, MMS, text, etc.), visual, motion, or audio information, as well as user access information shared between electronic devices. For example, the SFV device 501 may be configured to be notified by these smart devices of interior and exterior weather conditions, air quality, allergens/pollen, peak hours, etc. Notification may be made through text, email, visual, or audio information provided by remote computing devices 531, server 511, and/or smart thermostat 541 or any other electronic device mentioned above. Once a smart device (e.g. thermostat 541) detects an individual, environmental conditions and/or features may be relayed to the SFV device 501 and/or sensor modules 450, then to a server 511 or remote computing device 531 for requesting or determining an appropriate response. In this way, the SFV device 501 and/or sensor modules 450 act as a hub for collecting and processing interior and exterior environmental conditions from other electronic devices then prompting the server 511 or remote computing device 531 for control instructions to activate, deactivate, reverse, or control the speed of fan 103, and to open, close, or partially open the cover 207, louvers 207a, louvers rods 207b, grille 106b and movable portions 106c of one or more SFV devices 501.

FIGS. 6A-6B illustrate exemplary methods of operating an SFV device. These exemplary methods are provided by way of example, as there are a variety of ways to carry out these methods. Each block shown in FIGS. 6A-6B represents one or more processes, methods or subroutines, carried out in the exemplary method. FIGS. 1-5 show exemplary embodiments of carrying out the methods of FIGS. 6A-6B for collecting and processing information, for illustration purposes only, FIG. 3 may be used to illustrate the processes of the exemplary method. The exemplary method may begin at block 600.

Referring to FIG. 6A, the exemplary method of using the SFV device 100 (e.g. operation using environmental conditions) begins at block 600, followed, by block 603 of attaching one or more SFV devices 100 to a window frame in a space, building, or structure. Each SFV device 100 may be easily detachable from the window frame, and may include a detachable cover.

In block 605, the process continues with connecting, one or more SFV devices 100 to a local wireless network through, for example, the network module 411 of the SFV device 100. The SFV device 100 may connect to a network of computers or smart devices 531, a local area network (LAN), a wide area network (WAN), or an Intranet, or a network of networks, for example, the Internet.

In block 607, the process continues with connecting one or more sensors to the one or more SFV devices 100 to provide the processor 402 with detected interior and/or exterior environmental conditions. The one or more sensors may be a sensor component, of a sensor module 450. The one or more sensors may be directly attached to, or detachably coupled to, the one or more SFV devices 100. The one or more sensors may also be remotely connected to the SFV device 100 to provide the processor 402 with detected environmental conditions and/or features.

In block 609, the SFV device 100 is connected to a server 511 through the local network connection. The processor 402 may use the network module 411 to establish and save a single connection or multiple means of connecting to the server 511 (e.g. using WiFi, cellular connection, or by using any IEEE 802.11 standard). Moreover, a remote computing device 531 (e.g. smart phone, smart device, or portable device) may facilitate connection of the SFV device 100 to a server 511.

In block 611, one or more SFV devices 100 are connected to one or more thermostats 541 through the local network connection. The processor 402 may use the network module 411 to establish and save a single connection or multiple means of connecting to the thermostat 541 (e.g. using WiFi, cellular connection, or by using any IEEE 802.11 standard). Moreover, a remote computing device 531 (e.g. smart phone, smart device, or portable device) may facilitate connection of the SFV device 100 to a thermostat 541. The SFV device 100 may communicate with thermostat 541 to determine whether to turn on one or more fans 130 of the SFV device 100 through a single action (e.g. user initiated action), set of actions (e.g. an algorithm, or program), or a list or blend of actions based one or more environmental conditions, a proximity of a remote computing device 531 or individual, a time of day, visual, motion, or audio information, a schedule, user(s) preferences, and the state of the SFV device 100, as described in the present disclosure.

In block 613, the process continues by transmitting, using the one or more sensors of the sensor module 450, at least one detected interior and/or exterior environmental condition of the space 300, building, or structure to the processor 402, server 511, or remote computing device 531. The sensors work together to detect, monitor, and transmit environmental conditions (e.g. sensors 455, 457, and 459 to detect and monitor interior and/or exterior climate).

In block 614, the at least one detected environmental condition is stored or updated in one or more databases. One or more databases may be used or created to store a category (e.g. time, room size, room name, season, power usage, peak usage times, inside and outside weather, user preferences, etc.) of detected environmental features and conditions, events, triggers, etc. The database store user behavior, user preferences, scheduling, and other settings based on user preferences. The databases may be stored on a storage/memory device 502 of the one or more SFV devices 100, or a storage device 512 of the server 511.

In block 615, the processor 402 or server 511 compares the one or more interior and/or exterior environmental conditions of the space 300, building, or structure with stored environmental conditions in a storage/memory device 502 of the one or more SFV devices 100, or a storage device 512 of the server 511.

In block 617, the process continues with the processor 402 operating one or more louvers 207a, one or more movable portions 106c of the grille 106b, or one or more fans 103 of one or more SFV devices 100. Then, in block 619, the processor 402 and/or server 511 notify the remote computing device 531 (e.g. user) and/or requesting further action from the remote computing device 531.

In block 621, the one or more other SFV devices 100 communicate to another one or more other SFV devices 100 to operate one or more louvers 207a, operate one or more movable portions 106c of the grille 106b, or operate one or more fans 103.

Referring to FIG. 6B, another exemplary method of using the SFV device 100 begins at block 630, followed by block 633 of determining by a processor 402 or server 511 interior and/or exterior environmental conditions within space 300. The individual may also define preferred operating behavior of one or more SFV devices 100 within the space 300. The SFV device 100 may further include programming to learn individual behavior and preferences to further aid in operating the cover 107, the grille 106b, and the fan 103 of the SFV device 100 directing airflow in space 300. The SFV device 100 adjusts cover 107, the grille 106b, and the fan 103 based on communication with other smart fans, other SFV devices 100, proximity of an individual to space 300, and interior and/or exterior environmental conditions for optimal delivery of airflow in space 300. Moreover, when it is not possible or effective to recirculate air in a space 300, for example, from one floor to another, or from one room to another, the SFV device 100 may recirculate air in the subspace 311 or 321 by periodically oscillating operating the fans 103 as an intake fan, an exhaust fan, or a standing fan.

In block 635, the process continues with communicating to the server 511 and/or remote computing device 531 the interior and/or exterior environmental conditions in the space 300.

In block 637, the processor 402, server 511, and/or remote computing device determine how to operate one or more louvers 207a, operate one or more movable portions 106c of the grille 106b, or operate one or more fans 103 of one or more SFV devices 100.

In block 639, the process continues with the processor 402 operating one or more louvers 207a, one or more movable portions 106c of the grille 106b, or one or more fans 103 of one or more SFV devices 100. Then, in block 641, the processor 402 and/or server 511 notify the remote computing device 531 (e.g. user) and/or requesting further action from the remote computing device 531.

In block 643, the processor 402, server 511, or remote computing device 531 instruct one or more SFV devices to operate one or more louvers 207a, operate one or more movable portions 106c of the grille 106b, or operate one or more fans 103.

In block 645, the processor 402, server 511, and/or remote computing device 531 requests another one or more SFV devices 100 to operate one or more louvers 207a, operate one or more movable portions 106c of the grille 106b, or operate one or more fans 103.

In block 646, additional SFV devices 100 or smart fans may be accessed by the processor 402, server 511, and/or remote computing device 531 to provide optimal delivery of airflow before heating, cooling, and/or fanning (e.g. using an HVAC system) of subspace 311 and 321 or space 300. Otherwise, the process of FIG. 6B ends at block 647.

[Definitions and Non-Limiting Language]

An exterior space may be defined as any space adjacent to a boundary of an interior space. The exterior space may be exterior to a building having interior spaces. Alternatively, the exterior space may be a space inside the building and opposite to or adjacent to an interior space. The interior space may be defined as a space partially or completely bounded by the walls of a building.

A remote computing device may be a smart device, a smart phone, a vehicle, a tablet, a laptop, a TV, or any electronic device capable of wirelessly connecting to a network or joining a wireless network. The remote computing device may be wirelessly and communicably associated to an individual either through a network or server (e.g. through a user account on the server, or WiFi™ login information), or through visual information collected by the SFV device. The terms remote computing device, individual, and user may be used interchangeably throughout the present disclosure.

The server may be a computer that provides data to other computers. It may serve data to systems on a local area network (LAN) or a wide area network (WAN) over the Internet. The server may comprise of one or more types of servers (e.g. a web server or file server), each running its own software specific to the purpose of the server for sharing services, data, or files over a network. The server may be any computer configured to act as a server (e.g. a desktop computer, or single or multiple rack-mountable servers) and accessible remotely using remote access software.

Proximity determination may be made by using a combination of visual, motion, and audio information. The sensor modules, server, remote computing device, and/or SFV device may defined a virtual perimeter for a real-world geographic area. The SFV devices may also respond to geofencing triggers. Geofencing may be accomplished using location aware devices through, for example, GPS, RFID technology, wireless network connection information, cellular network connection information, etc. Visual, motion, and audio information may be collected by the SFV device or server to substantiate an individual(s)/remote computing device(s) physical location.

The network may be a network of computers, a local area network (LAN), a wide area network (WAN), or an Intranet, or a network of networks, for example, the Internet. Moreover, various interfaces may be used to connect to the network such as cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication. The purpose of the network is to enable the sharing of files and information between multiple systems.

The term "within a proximity", "a vicinity", "within a vicinity", "within a predetermined distance", and the like may be defined between about 10 meters and about 2000 meters. The term "coupled" is defined as connected, whether directly or indirectly through intervening components, and is not necessarily limited to physical connections. The connection may be such that the objects are permanently connected or releasably connected. The term "substantially" is defined to be essentially conforming, to the particular dimension, shape, or other feature that the term modifies, such that the component need not be exact. For example, "substantially cylindrical" means that the object resembles a cylinder, but may have one or more deviations from a true cylinder. The term "comprising," when utilized, means "including, but not necessarily limited to"; it specifically indicates open-ended inclusion or membership in the so-described combination, group, series and the like.

The term "a predefined distance" may be defined as the distance of an approaching individual as the individual nears at least one SFV device, or a traceable object used in determining environmental features and/or conditions. The predefined distance may be defined as between about 1 meter and about 2000 meters.

The processor of the SFV device, remoting computing device, or server may perform an action (e.g. first, second, third, etc.) comprising of a single action, set of actions, or a list or blend of actions based on one or more of: a proximity of an individual(s) or remote computing device(s), a time of day, environmental conditions, visual, motion, or audio information, a schedule, user(s) preferences, and the state of the louvers and movable portions of the SFV device, as described above. The action may be any one of: opening the louvers, closing the louvers, or partially opening the louvers, alternately opening louvers, and opening and closing louvers by oscillating from open to close (e.g. from about 0° to about 180°), opening the movable portions, closing the movable portions, or partially opening the movable portions, alternately opening movable portions, and opening and closing movable portions by oscillating from open to close.

The action may also include playing a music file, sound file, greeting, or message in response to a detected change in occupancy and/or environmental conditions, or in response to a detected or defined audio, proximity, visual, or motion trigger. The action may also comprise of controlling other smart devices as communicated through the SFV device or server, for example, turning on a standing fan, pedestal fan, tabletop fan, ceiling fan, light fixture, outlet, and communicating with remote computing device(s) or detected individual(s). The action may also comprise of sending an email, text, or SMS to a server, smart devices, or remote computing device(s).

Those of skill in the art will appreciate that the foregoing disclosed systems and functionalities may be designed and configured into computer files (e.g. RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed in devices, such as, an IoT system, the SFV device, or a combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor, and the storage medium may reside as discrete components in a computing device or user terminal.

Further, specific details are given in the description to provide a thorough understanding of the embodiments. However, embodiments may be practiced without these specific details. For example, well-known circuits, processes, algorithms, structures, and techniques have been shown without unnecessary detail to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Where applicable, various embodiments provided by the present disclosure may be implemented using hardware, software, or combinations of hardware and software. In addition, where applicable, the various hardware components and/or software components, set forth herein, may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software or application, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

The embodiments shown and described above are only examples. Many details are often found in the art such as the other features of an image device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts, within the principles of the present disclosure, up to and including the full extent established by the broad general meaning of the terms used in the claims. It will therefore be appreciated that the embodiments described above may be modified within the scope of the claims.

What is claimed:

1. A smart fan and ventilation (SFV) device comprising:
at least one memory;
a processor, coupled to the at least one memory;
a cover, the cover positioned on a first surface of the SFV device;
one or more louvers attached to the cover;
a network module, the network module coupling the SFV device to a local wireless network;
wherein the processor is configured to cause the one or more louvers to move based on instructions stored on the at least one memory;
wherein the SFV device is communicably coupled to one or more sensors, wherein the one or more sensors collect at least one of an interior environmental condition or an exterior environmental condition;
wherein the instructions are based at least on interior environmental conditions or exterior environmental conditions collected by the one or more sensors;
wherein each of the one or more louvers comprises of a plate surface attached to a screen surface, wherein the plate surface comprises a top and a bottom surface and the screen surface comprises a top and bottom surface, wherein either the top surface or the bottom surface of the plate surface attaches to an edge of the screen surface at a plane substantially perpendicularly to the plane of the top surface or the bottom surface of the screen surface.

2. The SFV device of claim 1, wherein the processor receives the instructions from a server or one or more other SFV devices.

3. The SFV device of claim 1, wherein at least one of the one or more sensors is integrated within the SFV device.

4. The SFV device of claim 1, wherein the cover is detachably coupled to the first surface of the SFV device.

5. The SFV device of claim 1, further comprising a grille having movable portions, wherein the grille is attached to a second surface of the SFV device, the second surface being spaced apart and parallel to the first surface.

6. The SFV device of claim 5, wherein the processor is further configured to cause the movable portions of the grille and the one or more louvers to change positions to isolate a first environment adjacent to the first surface from a second environment adjacent to the second surface, wherein the positions are one of an open position, a closed position, a partially open position or a partially closed position.

7. The SFV device of claim 1, wherein the SFV device is mountable within a window frame of a window without the need to remove a window screen of the window and wherein the window screen is adjacent to the second surface.

8. The SFV device of claim 7, wherein the first surface of the SFV is mounted flush to a window frame front side.

9. The SFV device of claim 1, wherein the one or more sensors is a rain sensor, and wherein the one or more louvers is positioned to a closed position when moisture is sensed by the rain sensor.

10. The SFV device of claim 1, wherein the one or more sensors is a temperature sensor and wherein the one or more louvers is positioned to a closed position or an open position when a predetermined delta temperature is triggered, wherein the predetermined delta temperature is the difference between an interior environment temperature and an exterior environment temperature.

11. The SFV device of claim 1, wherein the one or more louvers is operated by at least one motor to move, slide, or rotate to an open position, a closed position, partially closed position or partially opened position.

12. The SFV device of claim 1, wherein the one or more louvers is selected to have the plate surface or the screen surface parallel to the first surface.

13. The SFV device of claim 1, wherein the plate surface is a substantially nonpermeable surface and the screen surface is a substantially permeable surface and wherein the one or more louvers is positioned to the open position when the screen surface is selected parallel to the first surface and to the closed position when the plate surface is selected parallel to the first surface.

14. The SFV device of claim 1, further comprising a dispenser for storing a dispersible substance.

15. A method comprising:
detecting, by one or more sensors, at least one of an interior environmental condition or an exterior environmental condition;
communicating the at least one of the interior environmental condition or the exterior environmental condition to a smart fan and ventilation (SFV) device;
coupling the SFV device to a local wireless network; and
performing a first action, by the SFV, based on the detecting;
wherein the first action comprises of moving one or more louvers; and
wherein each of the one or more louvers comprises of a plate surface attached to a screen surface, wherein the plate surface comprises a top and a bottom surface and the screen surface comprises a top and bottom surface, wherein either the top surface or the bottom surface of the plate surface attaches to an edge of the screen surface at a plane substantially perpendicularly to the plane of the top surface or the bottom surface of the screen surface.

16. The method of claim 15, wherein the one or more louvers are attached to a cover, and the first action comprises of moving the one or more louvers of the SFV device to an open position, a closed position, a partially open position or partially closed position.

17. The method of claim 16, wherein the first action further comprises of moving a movable portion of a grille of the SFV device to an open position, a closed position, a partially open position or partially closed position.

18. The method of claim 17, further comprising of comparing the at least one of the interior environmental condition or the exterior environmental condition acquired by the one or more sensors to user preferences stored in a database prior to performing a second action.

19. The method of claim 18, wherein the second action comprises of moving both the one or more louvers of the cover and the movable portions of the grille to an open position, or a closed position.

20. The method of claim 17, wherein a user is prompted to approve of moving both the one or more louvers of the cover and the movable portions of the grille to an open position, or a closed position.

21. The method of claim 15, wherein the at least one of the interior environmental condition or the exterior environmental condition detected by the one or more sensors comprises of at least one of a temperature, humidity, smoke, CO, $CO_2$, air particulate, ambient light, motion, barometer, infrared, airflow or airspeed information.

22. The method of claim 15, wherein at least one of the one or more sensors is integrated within the SFV device.

\* \* \* \* \*